United States Patent
Kato et al.

(10) Patent No.: US 7,336,589 B2
(45) Date of Patent: Feb. 26, 2008

(54) INFORMATION RECORDING APPARATUS AND INFORMATION RECORDING METHOD

(75) Inventors: Masahiro Kato, Saitama (JP); Tatsuhiro Yone, Saitama (JP)

(73) Assignee: Pioneer Corporation, Tokyo (JP)

( * ) Notice: Subject to any disclaimer, the term of this patent is extended or adjusted under 35 U.S.C. 154(b) by 460 days.

(21) Appl. No.: 10/827,518

(22) Filed: Apr. 20, 2004

(65) Prior Publication Data
US 2005/0030871 A1   Feb. 10, 2005

(30) Foreign Application Priority Data
Apr. 21, 2003  (JP)  ............................. 2003-115357

(51) Int. Cl.
*G11B 7/00* (2006.01)
(52) U.S. Cl. .................... 369/116; 369/47.51
(58) Field of Classification Search ............... 369/116, 369/44.41, 44.42, 120, 121, 122, 47.5, 47.51, 369/47.1
See application file for complete search history.

(56) References Cited

U.S. PATENT DOCUMENTS 6,421,314 B1 * 7/2002 Maruyama .................. 369/116

7,038,989 B2 * 5/2006 Asada et al. ............. 369/59.11
2002/0176461 A1   11/2002 Nihei et al.

FOREIGN PATENT DOCUMENTS

| JP | 2000-149302 | 5/2000 |
|---|---|---|
| JP | 2002-230813 | 8/2002 |
| WO | 01/18797 | 3/2001 |

* cited by examiner

*Primary Examiner*—Nabil Hindi
(74) *Attorney, Agent, or Firm*—Drinker Biddle & Reath LLP

(57) ABSTRACT

An information recording apparatus irradiates a recording light, such as a laser light, on a recording medium, such as various kinds of optical discs, and records information. A recording pulse signal is generated based on a recording signal corresponding to the information to be recorded. The recording pulse signal is also called "strategy signal", and the signal includes driving pulses which drive a light source for forming a recording mark on the recording medium. As to the recording light such as the laser light, the high frequency signal is superimposed for decreasing occurrence of noise due to mode hopping. The high frequency signal is generated as a digital signal, and the signal is added to the recording pulse signal to generate a driving pulse signal. Then, the light source is driven and the recording light is emitted. By generating the high frequency signal as the digital signal, it is possible to control a frequency and a phase thereof with high accuracy.

12 Claims, 10 Drawing Sheets

FIG. 4

(EXAMPLE OF HIGH FREQUENCY SIGNAL TABLE)

FIG. 5

RECORDING MARK LENGTH

| Ts \ Tm | 3T | 4T | LARGER THAN 5T |
|---|---|---|---|
| 3T | D33 | D34 | D35 |
| 4T | D43 | D44 | D45 |
| LARGER THAN 5T | D53 | D54 | D55 |

FRONT SPACE LENGTH

<EXAMPLE OF WAVEFORM CONTROL TABLE>

| PULSE WIDTH [T] | RECORDING POWER [mW] | | | | | | | | | | |
|---|---|---|---|---|---|---|---|---|---|---|---|
| | 10 | 11 | 12 | 13 | 14 | 15 | 16 | 17 | 18 | 19 | 20 |
| 0.10 | D10 | D11 | D12 | D13 | ⋮ | ⋮ | ⋮ | ⋮ | ⋮ | ⋮ | D20 |
| 0.20 | D20 | D21 | ⋮ | ⋮ | ⋮ | ⋮ | ⋮ | ⋮ | ⋮ | ⋮ | D30 |
| 0.30 | D30 | D31 | ⋮ | ⋮ | ⋮ | ⋮ | ⋮ | ⋮ | ⋮ | ⋮ | ⋮ |
| 0.40 | D40 | ⋮ | ⋮ | ⋮ | ⋮ | ⋮ | ⋮ | ⋮ | ⋮ | ⋮ | ⋮ |
| 0.50 | D50 | ⋮ | ⋮ | ⋮ | ⋮ | ⋮ | ⋮ | ⋮ | ⋮ | ⋮ | ⋮ |
| 0.60 | D60 | ⋮ | ⋮ | ⋮ | ⋮ | ⋮ | ⋮ | ⋮ | ⋮ | ⋮ | ⋮ |
| 0.70 | D70 | ⋮ | ⋮ | ⋮ | ⋮ | ⋮ | ⋮ | ⋮ | ⋮ | ⋮ | ⋮ |
| 0.80 | D80 | ⋮ | ⋮ | ⋮ | ⋮ | ⋮ | ⋮ | ⋮ | ⋮ | ⋮ | ⋮ |
| 0.90 | D90 | D91 | ⋮ | ⋮ | ⋮ | ⋮ | ⋮ | ⋮ | ⋮ | ⋮ | ⋮ |
| 1.00 | D100 | D101 | ⋮ | ⋮ | ⋮ | ⋮ | ⋮ | ⋮ | ⋮ | ⋮ | D120 |

FIG. 11A

FIG. 11B ex) WAVEFORM DATA D100

FIG. 11C

INFORMATION RECORDING APPARATUS AND INFORMATION RECORDING METHOD

BACKGROUND OF THE INVENTION

1. Field of the Invention

The present invention relates to an information recording technique on an optical disc.

2. Description of Related Art

Information recording on a recordable-type optical disc on which information is additionally recordable and rewritable is performed by driving a laser light source by a pulse signal corresponding to recording data, generating a recording laser light and irradiating it on an information recording surface of the optical disc. As a laser light source, a semiconductor laser such as a laser diode is utilized. Power of the recording laser light is controlled by controlling current quantity which is supplied to the laser diode by a driving circuit such as a laser driver. The laser driver switches plural current sources whose current quantity is preset according to a driving pulse signal corresponding to information to be recorded, and drives the laser diode. The driving pulse signal controls the laser emitting power from the laser diode, and recording pits (recording marks) corresponding to data to be recorded are formed on the optical disc.

Hence, a noise characteristic of the semiconductor laser largely affects recording quality. For example, a portion of an outputting light from the semiconductor laser returns to the semiconductor laser by a reflected light from a recording medium and other causes, a jump in a longitudinal mode, a so-called "mode hopping", occurs, and laser output is varied. As a result, a noise occurs. This kind of noise is particularly problematic in the field of the semiconductor laser. As a method of reducing the noise of such the semiconductor laser, there is known a so-called high frequency signal superimposing method which superimposes a high frequency signal on a recording pulse signal in recording the information on the optical disc.

In adopting the high frequency signal superimposing method, there are suggested two methods, i.e., a method of varying a frequency and an amplitude of a superimposed high frequency signal according to an operation mode of the optical disc recording apparatus, which is disclosed in Japanese Patent Application Laid-open under No. 2000-149302, and a method of controlling a superimposing timing of the high frequency signal, which is disclosed in Japanese Patent Application Laid-open under No. 2002-230813.

Recently, there is a strong demand for high-speed recording. For the purpose of realizing the high-speed recording, the recording pulse signal tends to become high-speed, i.e., the frequency of the recording pulse signal tends to become higher. As a result, there occurs a problem that the frequencies of the superimposed high frequency signal and the recording pulse signal become closer to each other, and interference occurs between them. Specially, at the rise-up and fall-down portions of the recording pulse signal, an effect which the high frequency signal gives the recording pulse signal becomes large, and the recording quality may be deteriorated.

As described in the above-mentioned Japanese Patent Applications, in the conventional high frequency signal superimposing method, since the high frequency signal is generated by an analog circuit, the high frequency signal does not have correlation with the recording pulse signal. Thus, it is difficult to perform an optimum control of the frequency and an superimposing quantity of the high frequency signal according to a power of the laser light during recording the information, such as a write power, an erase power, and a bias power. Also, since the high frequency signal is not synchronous with the recording pulse signal, the phase relation between the high frequency signal and the recording pulse signal cannot be controlled. Therefore, a driving pulse signal for driving the semiconductor laser becomes unstable by the effect of the high frequency signal, and the recording quality of the information can be deteriorated.

SUMMARY OF THE INVENTION

The present invention has been achieved in order to solve the above problems. It is an object of this invention to reduce an effect, which the high frequency signal gives the recording pulse signal, in an information recording apparatus and an information recording method which adopt a high frequency signal superimposing method, and thereby to prevent the degradation of a recording quality.

According to one aspect of the present invention, there is provided an information recording apparatus including: a light source which emits a recording light for information recording, a recording pulse generating unit which generates a recording pulse signal corresponding to an inputted recording signal, a high frequency signal generating unit which generates a digital high frequency signal based on the recording signal, an adder which adds the recording pulse signal and the high frequency signal to generate a driving pulse signal, and a driving unit which drives the light source based on the driving pulse signal to emit the recording light.

The above-mentioned information recording apparatus emits the recording light such as the laser light on the recording medium like various optical discs, and records the information thereon. When the recording signal corresponding to the information to be recorded is inputted, the recording pulse signal is generated based on the inputted recording signal. The recording pulse signal is also called "strategy signal", and includes the driving pulses which drive the light source for forming the recording mark on the recording medium.

To the recording light such as the laser light, the high frequency signal is superimposed to reduce an occurrence of noise caused by mode hopping and the like. In the invention, the high frequency signal is generated as the digital signal and is added to the recording pulse signal to generate the driving pulse signal. By the driving pulse signal, the light source such as a laser diode is driven and the recording light is emitted. By generating the high frequency signal as the digital signal, it becomes possible that the frequency and the phase thereon are controlled with high accuracy. Therefore, by generating an appropriate high frequency signal based on the recording signal, an adverse effect by a superimposition of the high frequency signal can be suppressed, and the recording characteristic can be improved.

Preferably, the above-mentioned high frequency signal may have a constant phase relation with the recording pulse signal at the rise-up portion and the fall-down portion of each pulse included in the recording pulse signal. Thereby, even when the high frequency signal is superimposed, stable information recording is possible because the shape of the driving signal can be fixed. In one concrete method, the frequency of the high frequency signal in each pulse period is determined to have the constant phase relation with the recording pulse signal at the rise-up portion and the fall-down portion of each pulse included in the recording pulse signal. The state of "having the constant phase relation" may be that the phase of the high frequency signal coincides with the phase of the recording pulse signal at the rise-up portion and the fall-down portion of each pulse included in the recording pulse signal, and may be that the phase of the high frequency signal is ahead of or behind the phase of the recording pulse signal by a constant angle.

Further, the high frequency signal generating unit may determine the amplitude of the high frequency signal to be optimum to the recording power level of each pulse period in each pulse period included in the recording pulse signal. Concretely, the high frequency signal may have the different amplitude in each period of each pulse included in the recording pulse signal.

The high frequency signal generating unit may include a high frequency signal table which stores high frequency signal data including the frequency and the amplitude predetermined corresponding to a recording mark length, a unit which refers to the high frequency signal table, based on the recording mark length included in the inputted recording signal, to obtain the frequency and the amplitude of the high frequency signal corresponding to each recording mark, and a unit which generates the digital high frequency signal having the obtained frequency and amplitude. Thereby, based on the recording mark in the recording signal, the frequency and the amplitude are determined by referring to the high frequency signal table prepared in advance, and the digital high frequency signal is generated. The high frequency signal table may define the high frequency signal data corresponding to not only the recording mark length, but also a space length before the recording mark length. Thereby, an appropriate high frequency signal can be generated by taking the effect of residual heat and the like into consideration.

Also, the recording pulse signal may be generated as the analog signal, and may be generated as the digital signal like the high frequency signal. When the recording pulse signal is generated as the digital signal, the driving pulse signal may be obtained by D/A converting the signal after adding the high frequency signal to the digital recording signal. Alternatively, the driving pulse signal may be obtained by adding the recording pulse signal and the high frequency signal, as the analog signals, after being individually D/A converted.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

[Principle]

Figure 1A:
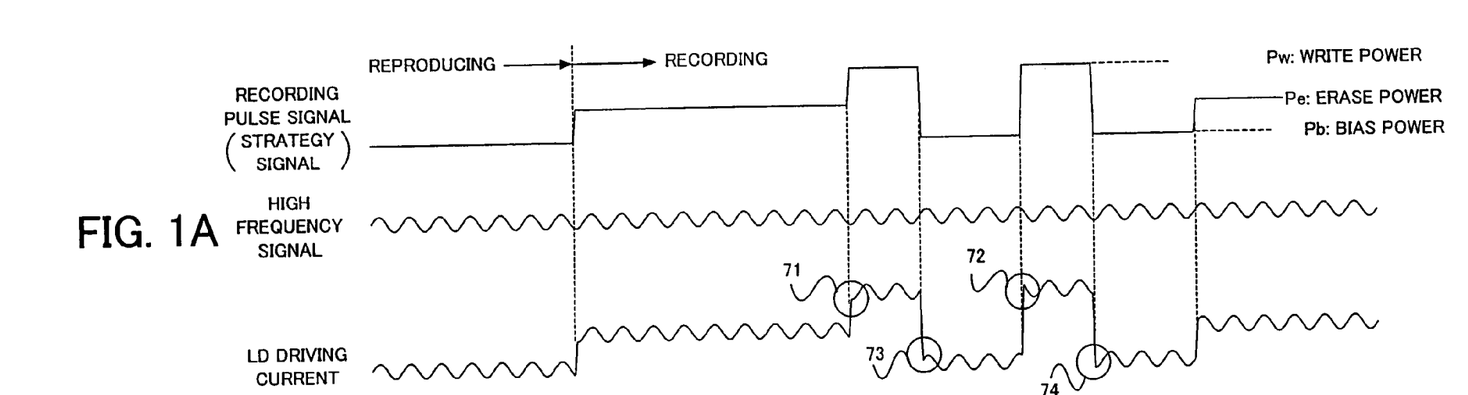
FIGS. 1A and 1B are examples of recording waveforms when information recording is performed on an optical disc by an information recording apparatus.
Figure 1B:
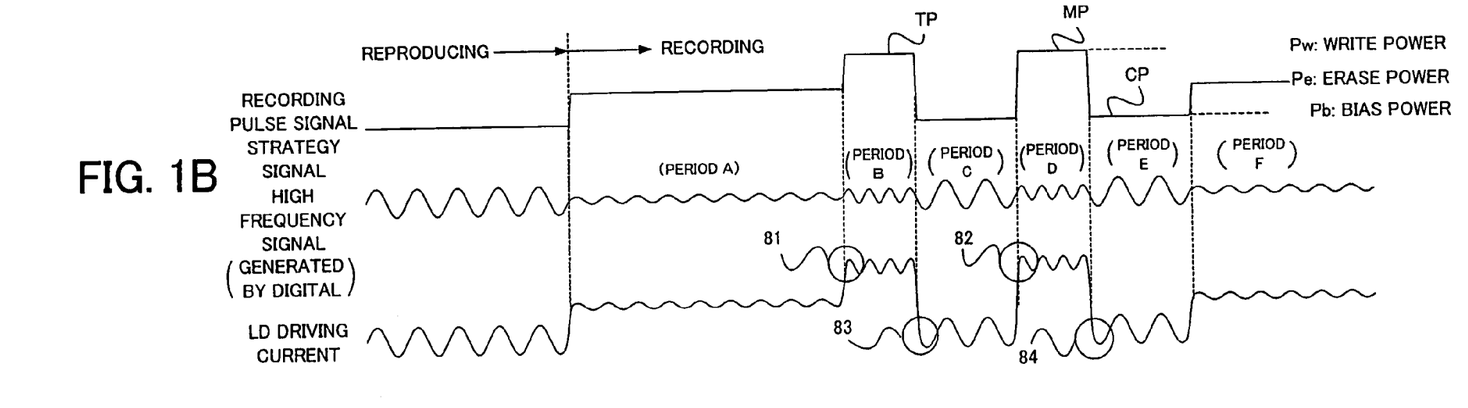

FIGS. 1A and 1B show examples of recording waveforms when the information recording is performed on the optical disc by the information recording apparatus. It is noted that the example is for a DVD-RW, which is an example of the optical disc. Since FIGS. 1A and 1B schematically show the relation between the signal waveforms, the frequency of each signal is different from its actual frequency.

FIG. 1A is an example when the high frequency signal generated by the analog circuit is superimposed on the recording pulse signal (strategy signal) in the high frequency signal superimposing method. In FIG. 1A, the recording pulse signal corresponds to the recording signal, and the signal includes three power levels, i.e., a write power Pw, an erase power Pe and a bias power Pb. The high frequency signal is superimposed on the recording pulse signal in the above-mentioned high frequency signal superimposing method. The high frequency signal is generated by the analog circuit. A current waveform of a signal obtained by adding the recording pulse signal and the high frequency signal is indicated as an LD driving current. The semiconductor laser, such as a laser diode, is driven by an LD driving current waveform, and a recording light to be irradiated on the optical disc is generated.

Since the high frequency signal is generated by the analog circuit in the example of FIG. 1A, it is difficult to perform the adaptive control of the frequency of the high frequency signal and the superimposing quantity. Also, since the high frequency signal and the strategy signal are not synchronized with each other, the waveforms of the rise-up/fall-down portions of the LD driving current are different at each portion. For example, at the rise-up portions 71 and 72 to the write power, the waveforms of the LD driving current are different. Also, at the fall-down portions 73 and 74 from the write power to the bias power, the waveforms of the LD driving current are different. Since the recording pulse signal and the high frequency signal are not synchronized with each other, the waveforms at the rise-up/fall-down portions of the LD driving current are affected by the phase of the high frequency signal at the timing, and the waveforms at the plural rise-up portions are not identical even in the identical LD driving current waveform. The same is true of the fall-down portion. As a result, the LD driving current waveforms corresponding to the identical recording signal do not coincide with each other, and the shapes of the formed recording marks become unstable.

FIG. 1B shows an example of the recording waveform in the information recording apparatus according to the present invention. In the present invention, the high frequency signal to be superimposed is generated as a digital signal. Hence, it becomes easy to control the frequency, the amplitude and the phase of the high frequency signal. Also, it becomes possible that the phases of the recording pulse signal and of the high frequency signal are coincided (synchronized) with each other at the rise-up/fall-down portion of the recording pulse signal, by generating the high frequency signal based on the recording signal. It is possible that the shapes of the waveforms at the rise-up/fall-down portions of the LD driving current are almost constant by synchronizing the recording pulse signal and the high frequency signal. For example, in FIG. 1B, the shapes of the LD driving current waveforms are almost identical at the rise-up portions 81 and 82 and at the fall-down portions 83 and 84 of the LD driving current. Thereby, the identical recording marks can be always formed for the identical recording signal, and a recording characteristic can be improved.

Figure 2:
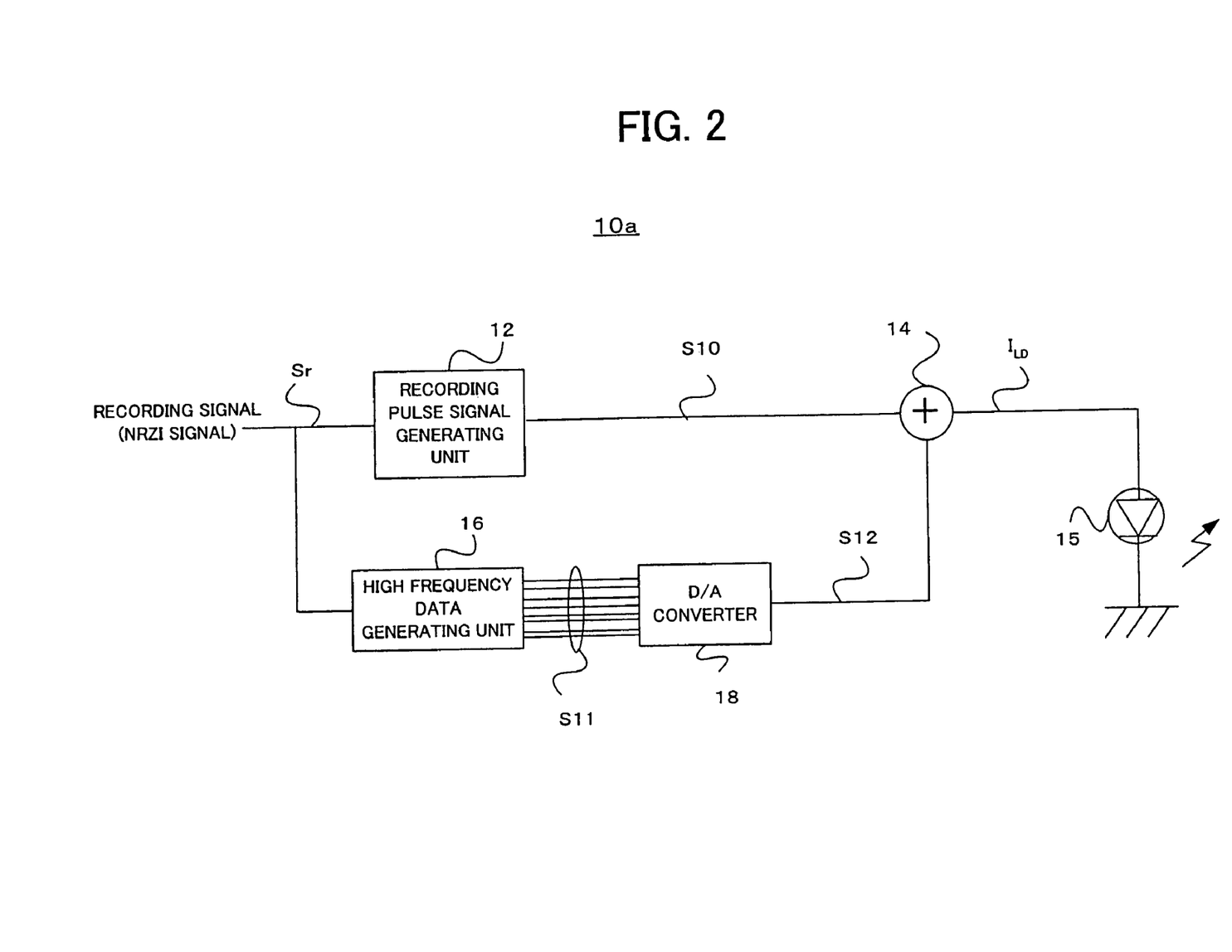
FIG. 2 is a diagram showing a schematic configuration of a recording unit according to the embodiment.

FIG. 2 shows a schematic configuration of a recording unit according to the embodiment of the present invention. A recording unit 10a is utilized as a recording unit in the information recording apparatus of the optical disc. The recording unit 10a receives the recording signal from the outside, and drives the laser diode by the driving pulse signal generated based on the recording signal to emit a recording laser light.

As shown in FIG. 2, the recording unit 10a includes a recording pulse signal generating unit 12, a high frequency data generating unit 16, a D/A converter 18, an adder 14, and a laser diode (hereafter, it is also called "LD") 15 serving as a light source.

The recording pulse signal generating unit 12 outputs a recording pulse signal S10, based on a recording signal Sr usually given as an NRZI signal. On the other hand, the high frequency data generating unit 16 generates a high frequency data S11 to be superimposed on the recording pulse signal S10, based on the recording signal Sr. Here, the high frequency data generating unit 16 generates the high frequency data as the digital signal. Namely, the high frequency data generating unit 16 utilizes a clock based on the recording signal Sr and generates the high frequency data S11 serving as the digital signal to supply the data to the D/A converter 18. The D/A converter 18 converts the high frequency data S11, being the digital signal, to the analog signal, and supplies the signal, as a high frequency signal S12, to the adder 14. It is noted that the high frequency signals of the digital signal and the analog signal are hereafter distinguished by being respectively called "high frequency data" and "high frequency signal".

The adder 14 adds the recording pulse signal S10 from the recording pulse signal generating unit 12 and the high frequency signal S12 from the D/A converter 18, and generates an LD driving current I$_{LD}$ to drive the LD 15.

The high frequency data generating unit 16 generates, based on the recording signal Sr, the high frequency data S11 so as to be synchronized, in phase, with the recording pulse signal S10 at the rise-up/fall-down portions of the recording pulse signal S10. Concretely, the frequency of the high frequency data S11 can be determined so that the high frequency signal is synchronized, in phase, with the recording pulse signal at the rise-up/fall-down portions of the recording pulse signal S10. Further, the high frequency data generating unit 16 can also vary the level (amplitude) of the high frequency data S11, according to the level of the recording pulse signal S10 (i.e., the write power level, the erase power level, and the bias power level).

Like this, in the present invention, since the high frequency signal superimposed on the recording pulse signal is generated as the digital signal so that the signal is synchronized with the recording pulse signal at the rise-up/fall-down portions of the recording pulse signal, the identical recording signals are always recorded by the identical LD driving wave forms. Hence, the recording characteristic can be improved, with eliminating the adverse effect of the high frequency signal.

[Information Recording and Reproducing Apparatus]

Figure 3:
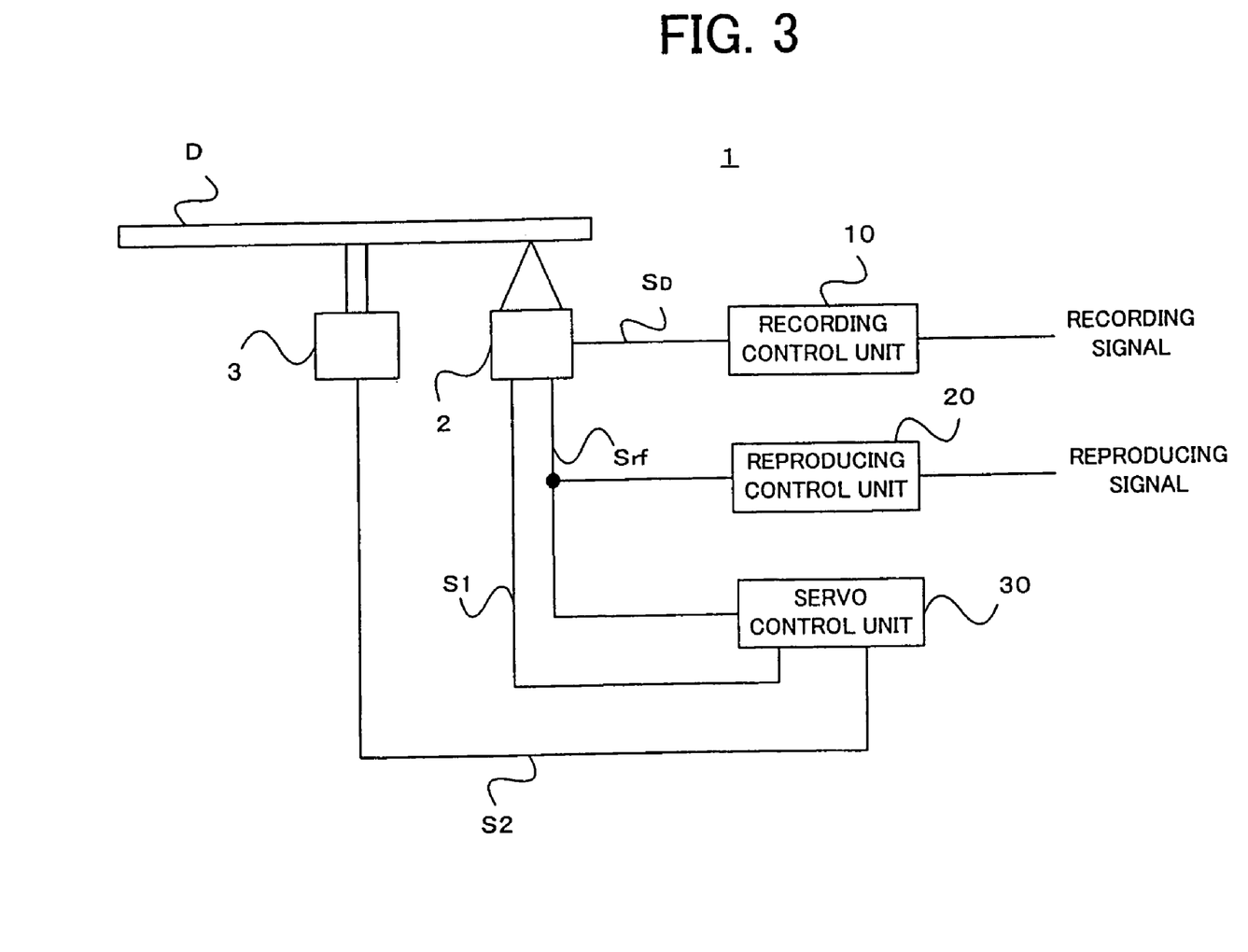
FIG. 3 is a diagram showing a schematic configuration of an information recording and reproducing apparatus according to the embodiment of the present invention.

FIG. 3 schematically shows a whole configuration of the information recording and reproducing apparatus according to the embodiment of the present invention. An information recording and reproducing apparatus 1 records the information on an optical disc D, and reproduces the information from the optical disc D. For example, the optical disc D may be a CD-R (Compact Disc-Recordable) and a DVD-R (Digital Versatile Disc-Recordable) for recording only once, and a CD-RW (Compact Disc-Rewritable) and a DVD-RW (Digital Versatile Disc-Rerecordable) that allow for repeated erasing and recording of information.

The information recording and reproducing apparatus 1 includes an optical pickup 2 which irradiates a recording beam and a reproducing beam on the optical disc D, a spindle motor 3 which controls rotation of the optical disc D, a recording control unit 10 which controls the recording of the information on the optical disc D, a reproducing control unit 20 which controls reproduction of the information already recorded on the optical disc D, and a servo control unit 30 which executes various kinds of servo control including a spindle servo which controls rotation of the spindle motor 3, and a focus servo and a tracking servo, both of which are relative position control of the optical pickup 2 with respect to the optical disc D.

The recording control unit 10 receives the recording data and generates a driving signal SD for driving a laser diode inside the optical pickup 2 by a process described below, and supplies the signal SD to the optical pickup 2.

The reproducing control unit 20 receives a read-out RF signal Srf which is output from the optical pickup 2, and generates and outputs reproducing data by executing a predetermined demodulating process and decoding process to the signal Srf.

The servo control unit 30 receives the read-out RF signal Srf from the optical pickup 2, and, based on the signal, supplies a servo signal S1 such as a tracking error signal and a focus signal to the optical pickup 2, and also supplies a spindle servo signal S2 to the spindle motor 3. Thus, various kinds of servo processes, such as a tracking servo, a focus servo and a spindle servo, are executed.

In the present invention, various kinds of known methods can be applied to the reproducing control and the servo control. Therefore, explanations thereof are not given in detail here.

1st Embodiment of Recording Control Unit

Figure 4:
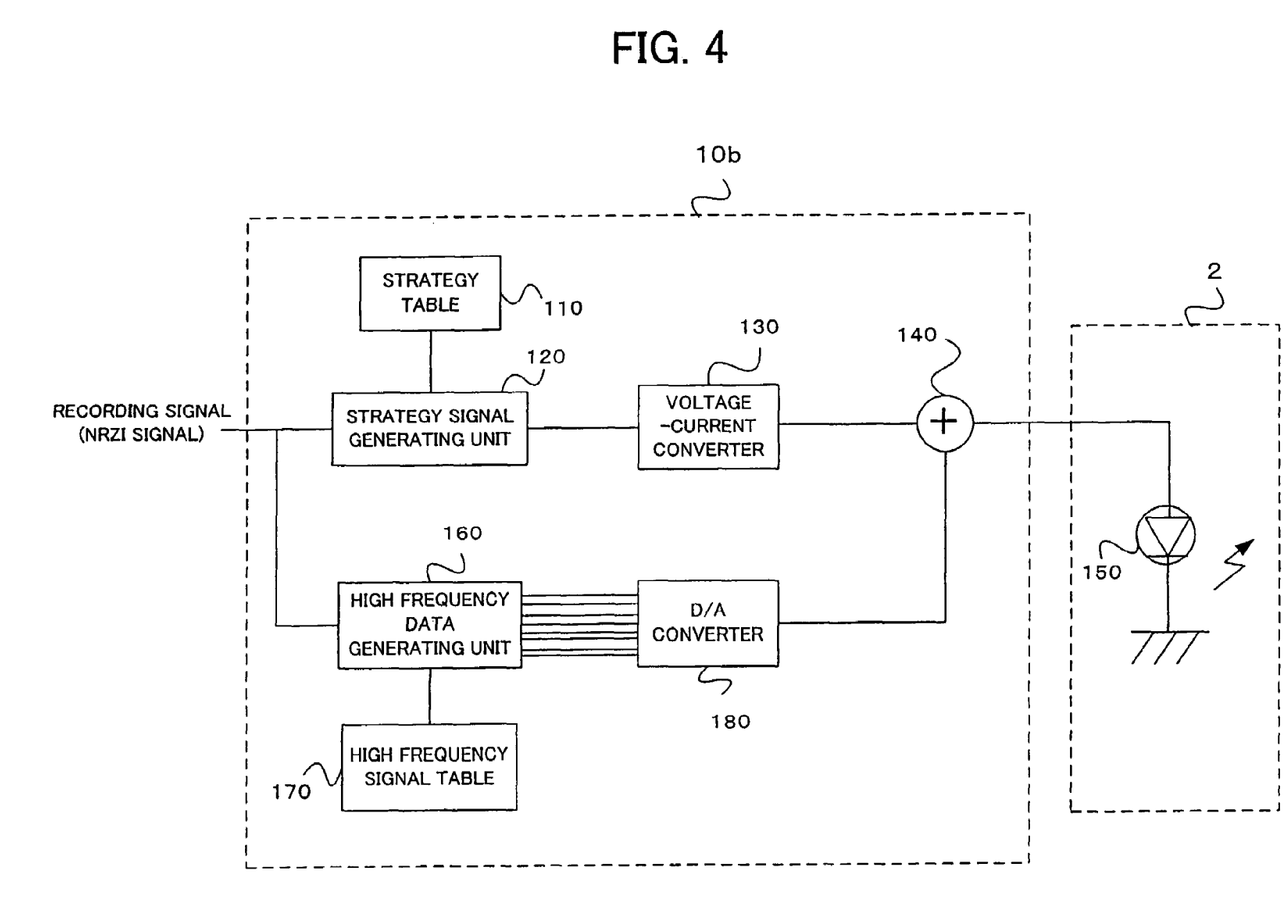
FIG. 4 is a diagram showing a configuration of a first embodiment of a recording control unit shown in FIG. 3.

FIG. 4 shows a configuration of the first embodiment of the recording control unit 10. A recording control unit 10b according to the first embodiment includes a strategy table 110, a strategy signal generating unit 120, a voltage-current converter 130, an adder 140, a high frequency data generating unit 160, a high frequency signal table 170, and a D/A converter 180. The strategy table 110, the strategy signal generating unit 120 and the voltage-current converter 130 are the components for generating the recording pulse signal. The high frequency signal table 170, the high frequency data generating unit 160 and the D/A converter 180 are the components for generating the high frequency signal.

The strategy signal generating unit 120 generates the strategy signal for recording according to the recording signal, based on the recording signal Sr. "Strategy" indicates the waveform of the recording pulse signal used to drive the laser diode 150 based on the recording signal. For example, the strategy may be a multi-pulse type strategy which is formed by one top pulse and a plurality of multi-pulses, or anon-multi-type strategy, such as a strategy having one top pulse and a lower level period than the top pulse thereafter, and a strategy having one top pulse, one last pulse and a medium level period between the top pulse and the last pulse. It is noted that any-type strategy can be utilized in the present invention.

The strategy table 110 stores the information about the strategies prepared in advance. Concretely, for each kind of disc, the recording data and the information of the recording pulse waveform corresponding to the recording data are stored in the strategy table 110. For example, when a certain recording data is to be recorded on a certain disc, detailed information of the recording pulse waveform is stored, e.g., what type of strategy is utilized (i.e., the above multi-pulse type or non-multi-pulse type), what values are taken for each top pulse width, multi-pulse width, multi-pulse number, write power level, bias power level and the like in the case of the multi-pulse-type. Therefore, the strategy signal generating unit 120 obtains the information of the strategy signal (recording pulse signal) by referring to the strategy table 110, based on the inputted recording signal, and generates the strategy signal to supply the signal to the voltage-current converter 130. The voltage-current converter 130 supplies, based on the strategy signal, the current corresponding to the amplitude to the adder 140.

Figure 5:
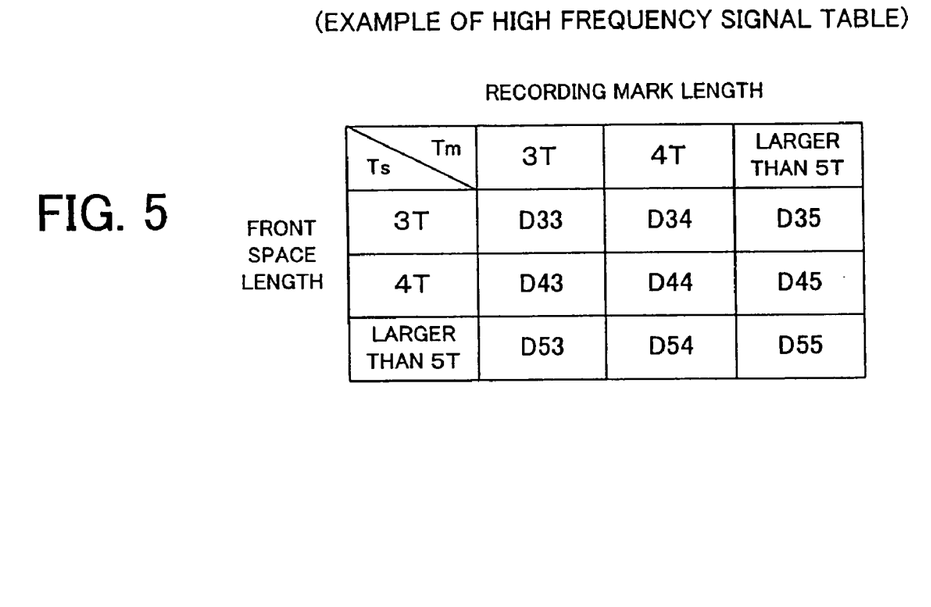
FIG. 5 shows an example of a high frequency signal table.

On the other hand, the high frequency signal table 170 stores a specification of the frequency and the amplitude of the optimum high frequency signal for each recording data as the high frequency signal information. It is noted that the high frequency signal information is predetermined and stored in the high frequency signal table 170. FIG. 5 shows an example of the high frequency signal information stored in the high frequency signal table 170. In the example of FIG. 5, the specification of the high frequency signal is determined dependently on the recording mark length and the space length preceding the recording mark (it is called "front space length"). For example, when both of the recording mark length given by the recording signal and the front space length are 3T, the specification of the high frequency signal is given by D33. When the strategy signal is of the multi-pulse-type, the specification D33 of the high frequency signal can be prescribed to define the frequency and the amplitude of the high frequency signal for each portion of the strategy signal, for example, the frequency of the front period of the top pulse is f1 and its amplitude is M1, the frequency of the top pulse period is f2 and its amplitude is M2, and the frequency of the multi-pulse period is f3 and its amplitude is M3, and so on.

In the example shown in FIG. 5, though the recording mark length and the front space length are respectively classified into three groups 3T, 4T, and equal to or larger than 5T, another method of classification may be applied, too. Also, the front space length and the recording mark length may be respectively classified into a different number of groups, e.g., the front space length is classified into three groups, and the recording mark length is classified into five groups. Moreover, in some kinds of the optical discs, the specification of the high frequency signal may be set dependently on only the recording mark length, irrespective of the front space length. Furthermore, the space length subsequent to the recording mark may be taken into consideration.

Returning to FIG. 4, the high frequency data generating unit 160 refers to the high frequency signal table 170 based on the recording signal, and generates the high frequency data being the digital signal to transmit the data to the D/A converter 180. In the example of FIG. 4, the D/A converter 180 is the type of current output, and converts the digital high frequency data generated by the high frequency data generating unit 160 to the analog high frequency signal, thereby to supply the corresponding current to the adder 140.

The adder 140 drives the LD 150 by the current corresponding to the sum of the current corresponding to the recording pulse signal supplied from the voltage-current converter 130 and the current of the high frequency signal supplied from the D/A converter 180. Thereby, the LD 150 is driven by the driving pulse signal on which the high frequency signal is superimposed, and the recording mark corresponding to the recording signal is formed on the optical disc D.

[Process for Producing High Frequency Signal Table]

Figure 6:
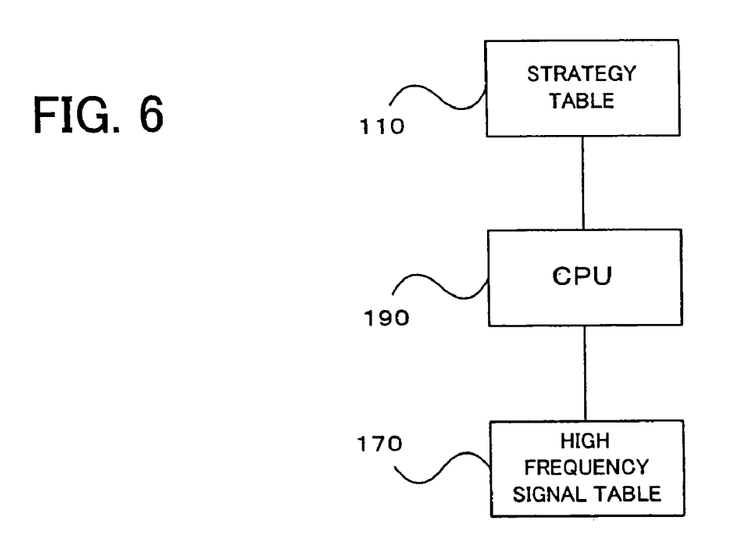
FIG. 6 shows an example of a configuration which produces a high frequency signal table.

Next, a process for producing the high frequency signal table will be explained. FIG. 6 shows a configuration for producing the high frequency signal table. As shown in FIG. 6, by executing a prepared program, a CPU 190 refers to the strategy table 110, and produces the high frequency signal information based on the strategy data to store the information in the high frequency signal table 170. Thereby, the high frequency signal table is produced.

Figure 7:
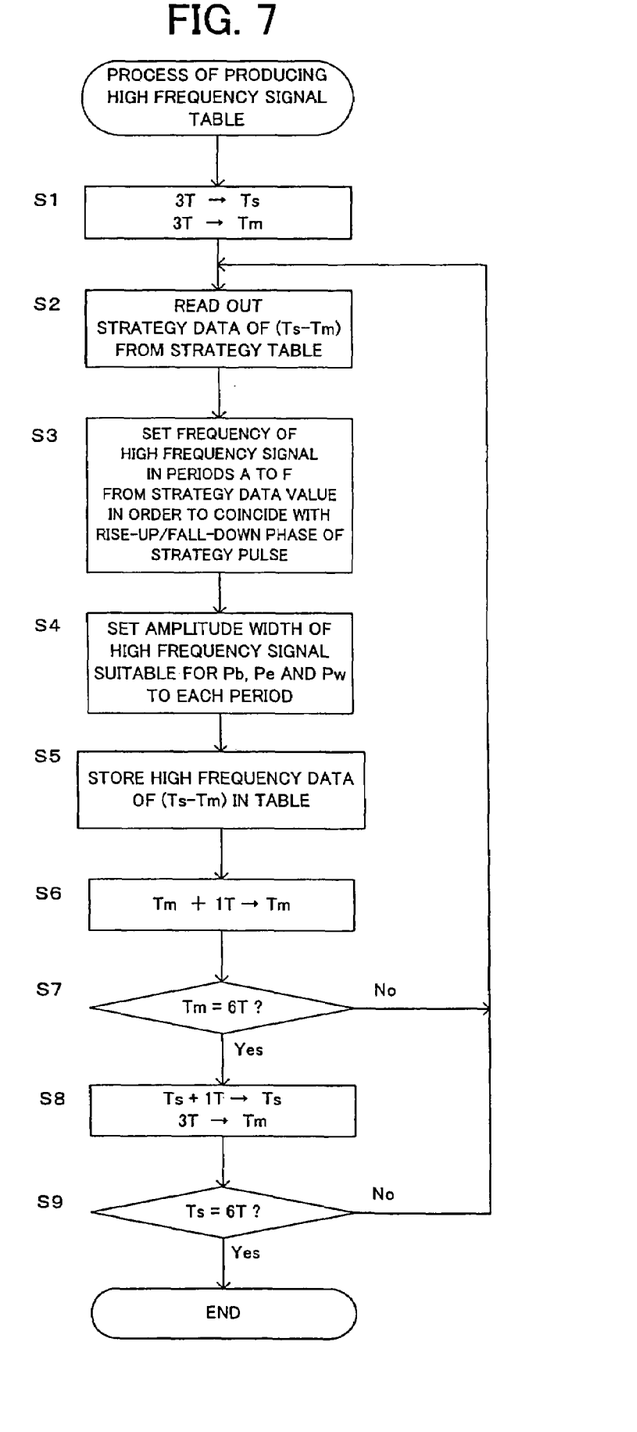
FIG. 7 is a flow chart of a producing process of a high frequency signal table.

FIG. 7 is an example of a flow chart of a process for producing the high frequency signal table. It is noted that the recording mark length and the front space length are respectively classified into three groups 3T, 4T and equal to or larger than 5T in the example, as shown in FIG. 5. Also, as shown in FIG. 1B, the strategy signal is formed by the top pulse TP and the predetermined number of multi-pulses MP, whose levels vary among the write power Pw, the erase power Pe and the bias power Pb.

Also, the periods of the strategy signal (recording pulse signal) shown in FIG. 1B are classified into PERIODs A to F as follows.

(PERIOD A): a period between the rise-up of the recording signal and the rise-up of the top pulse TP
(PERIOD B): a period of the top pulse TP
(PERIOD C): a period between the top pulse TP and the first multi-pulse MP
(PERIDO D): a period of the multi-pulse MP
(PERIDO E): a period of a cooling pulse CP
(PERIDO F): a period after the cooling pulse CP Referring to FIG. 7, first, 3T is substituted for each of a variable Ts of the front space length and a variable Tm of the recording mark length (step S1). Namely, first, the high frequency signal information D33 in FIG. 5 is produced.

Figure 8A:
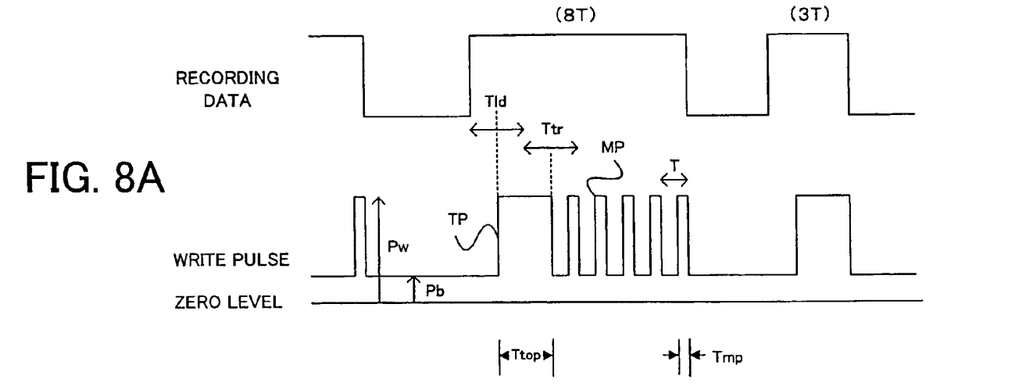
FIGS. 8A and 8B are diagrams explaining strategy data which is utilized in producing a high frequency signal table.
Figure 8B:
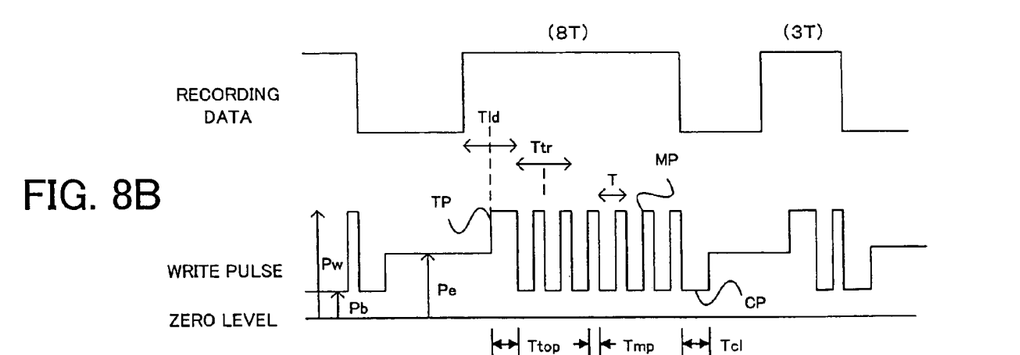

Next, the strategy data (the value of each portion of the strategy signal), in a case that the front space length is Ts and the recording mark length is Tm (hereafter, this condition is indicated as "(Ts-Tm)"), is read out from the strategy table (step S2). The strategy data includes a top pulse width Ttop, a multi-pulse width Tmp, a moving width of a rise-up edge of the top pulse Tld, a moving width of a fall-down edge of the top pulse Ttr, a bias level Pb, and the write power level Pw in a case of the multi-pulse-type strategy shown in FIG. 8A. Moreover, in a case of the multi-pulse-type strategy shown in FIG. 8B, the strategy data further includes a cooling pulse width Tcl and an erase level Pe.

Next, based on the strategy data obtained in that way, the frequency of the high frequency signal in each PERIOD A to F shown in FIG. 1B is determined (step S3). Concretely, for each PERIOD A to F, the frequency of the high frequency signal is determined so that the phases of the strategy signal and the high frequency signal coincide with each other, i.e., the strategy signal and the high frequency signal are synchronized with each other at the rise-up and fall-down timing of each pulse forming the strategy signal. Thereby, the driving pulse waveform, which drives the LD at the rise-up and the fall-down portions of each pulse of the strategy signal, becomes always identical, and it becomes possible to constantly form the identical recording mark. However, in this case, it is required that the frequency of the high frequency signal is varied only within a range in which the original noise suppression effect by superimposing the high frequency signal can be obtained. Concretely, the variation of the frequency is limited within a predetermined range from a basic frequency of the high frequency signal determined in each information recording apparatus.

Next, for each PERIOD A to F of the strategy signal, the appropriate amplitude of the high frequency signal is determined, correspondingly to the power level (Pw, Pe and Pb) in the period (step S4). The high frequency signal data determined in that way is stored in the high frequency signal table 170 (step S5).

As explained above, when the high frequency signal data at (3T-3T) is obtained, the recording mark length Tm is increased by 1T (step S6), and whether or not the recording mark length Tm becomes 6T is determined (step S7). When the recording mark length Tm does not become 6T (step S6: No), the process returns to step S2. Like this, by repeating steps S2 to S6 until the recording mark length Tm becomes 6T, the high frequency signal data whose recording mark lengths are 3T, 4T and equal to or larger than 5T as to the front space length 3T is produced, and the data is stored in the high frequency signal table 170.

When the recording mark length Tm becomes 6T in step S7, the front space length Ts is increased by 1T, the recording mark length Tm is returned to 3T, and the process returns to step S2. In that way, by repeating the process until the front space length Ts becomes 6T, as shown in FIG. 5, the high frequency data is produced and stored in the high frequency signal table, as to nine conditions when the front space lengths Ts are 3T, 4T and equal to or larger than 5T and when the recording mark lengths Tm is 3T, 4T and equal to or larger than 5T.

In the above example, the amplitude of the high frequency signal is determined in accordance with the power level in each PERIOD A to F in step S4. However, the amplitude may be identical in the PERIODs A to F, with varying only the frequency of the high frequency signal in each PERIOD A to F.

Also, in the above example, in step S3, the frequency of the high frequency signal is determined so that the phases of the strategy signal and the high frequency signal coincide with each other. However, without making the phases of both signals coincide with each other, the frequency of the high frequency signal may be determined so that the phases of both signals have a constant phase relation. Namely, in a case of making the phases of the strategy signal and the high frequency signal coincide with each other, the phase of the high frequency signal also becomes 0 degrees when the phase of the strategy signal is 0 degrees, and the phase of the high frequency signal becomes 180 degrees when the phase of the strategy signal is 180 degrees. On the other hand, the frequency of the high frequency signal may be determined so that the phases of both signals have the constant phase relation, e.g., so that the phase of the high frequency signal is always 180 degrees behind the phase of the strategy signal. In that case, the waveforms at the rise-up and the fall-down of each pulse portion in the strategy signal are identical, as long as the phases of both signals keep the constant phase relation. Therefore, the recording marks of identical shape can be always formed stably.

2nd Embodiment of Recording Control Unit

Figure 9:
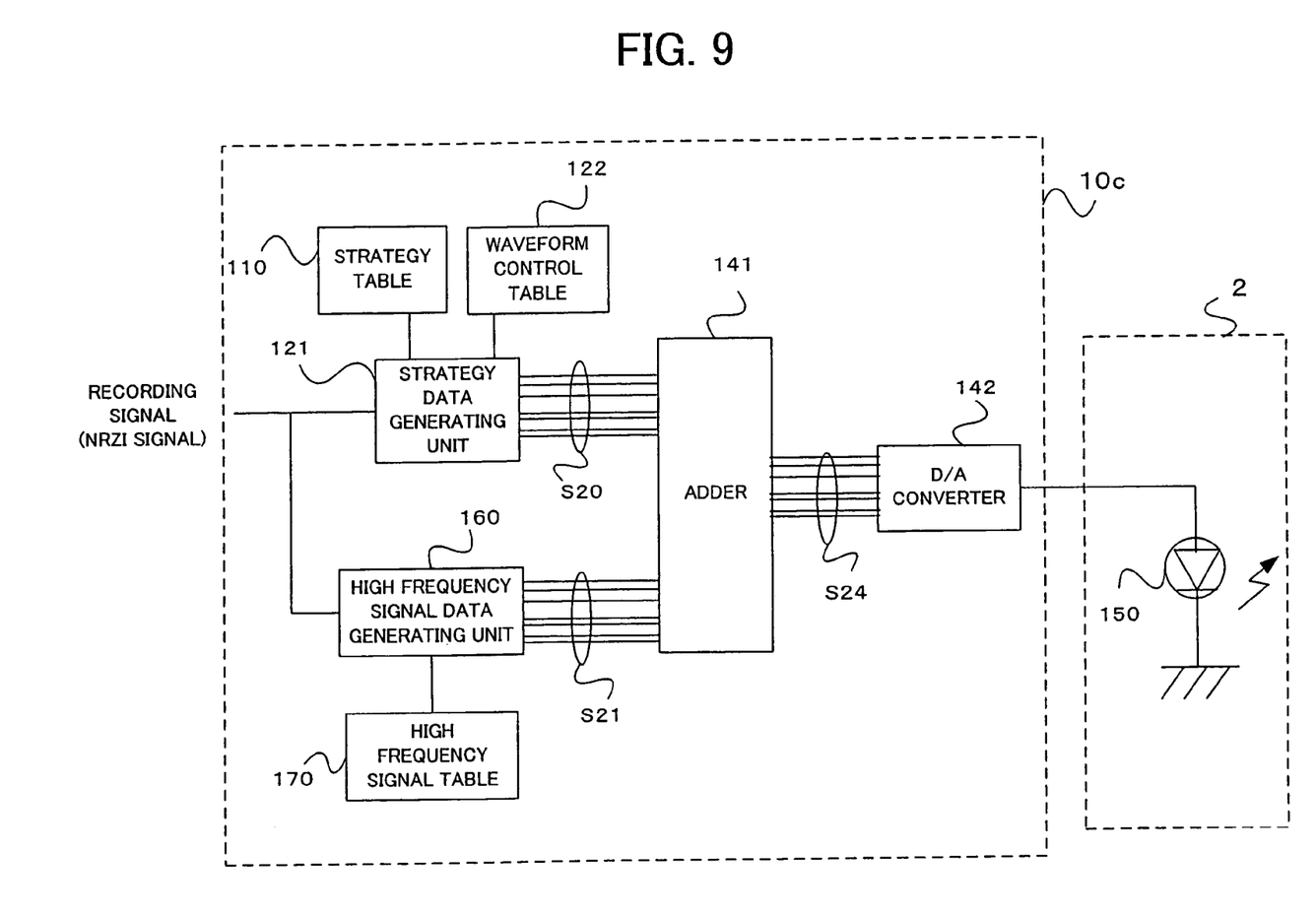
FIG. 9 is a diagram showing a configuration of a second embodiment of a recording control unit shown in FIG. 3.

Next, the second embodiment of the recording control unit will be explained with reference to FIG. 9. FIG. 9 shows a configuration of a recording control unit 10*c* according to the second embodiment. It is noted that the identical reference numerals are given to the identical components to the recording control unit 10*b* of the first embodiment shown in FIG. 4.

Though the strategy signal is generated as the analog signal in the recording control unit 10*b* of the first embodiment, the strategy signal is generated as the digital data in the recording control unit 10*c* of the second embodiment. That is the difference from the first embodiment.

Figure 10:
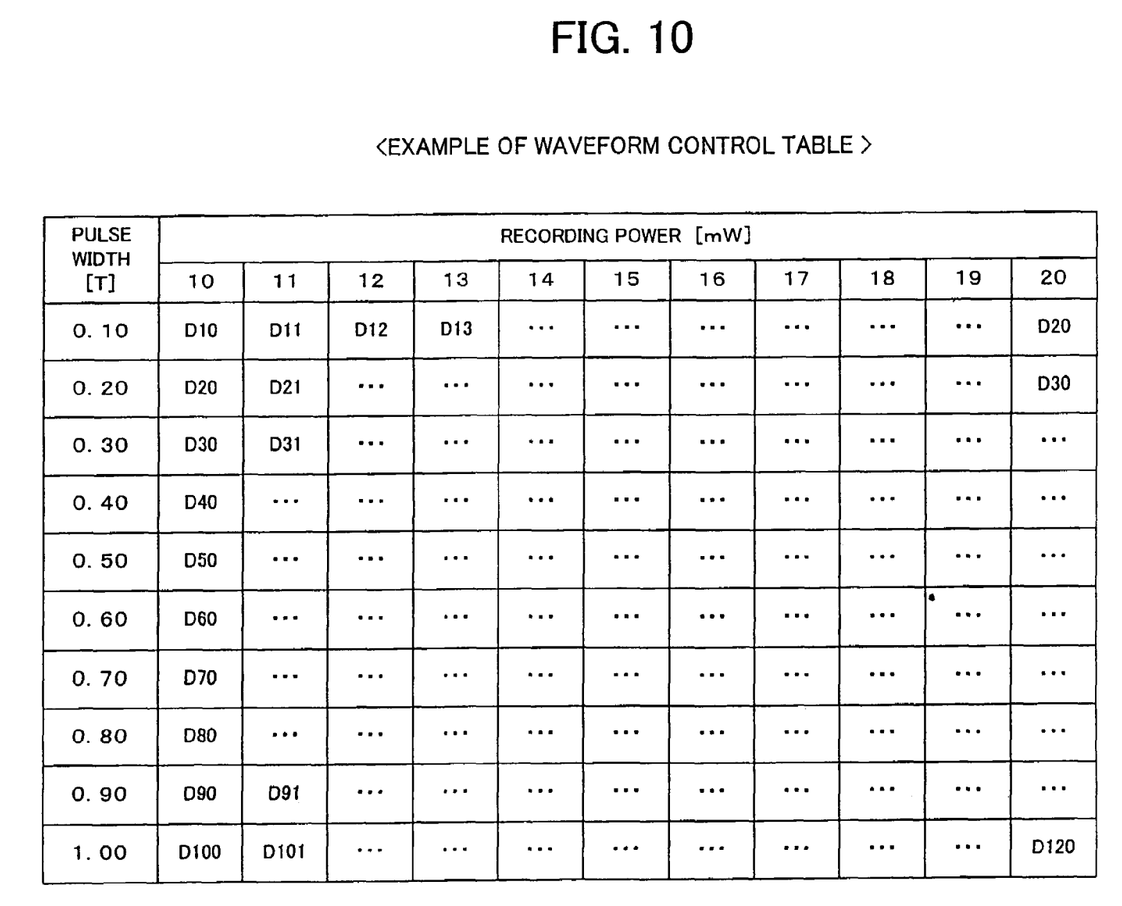
FIG. 10 shows an example of a waveform control table shown in FIG. 9.
Figure 11A:
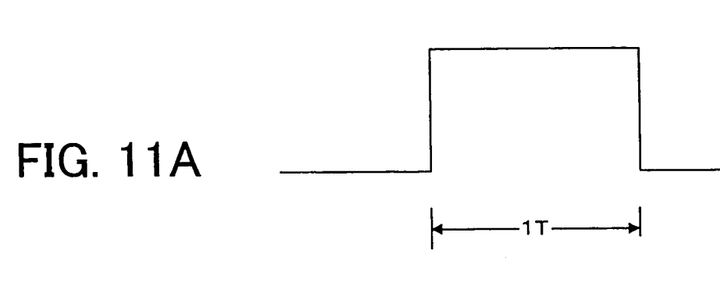
FIGS. 11A to 11C show examples of digital data which is stored in a waveform control table.
Figure 11B:
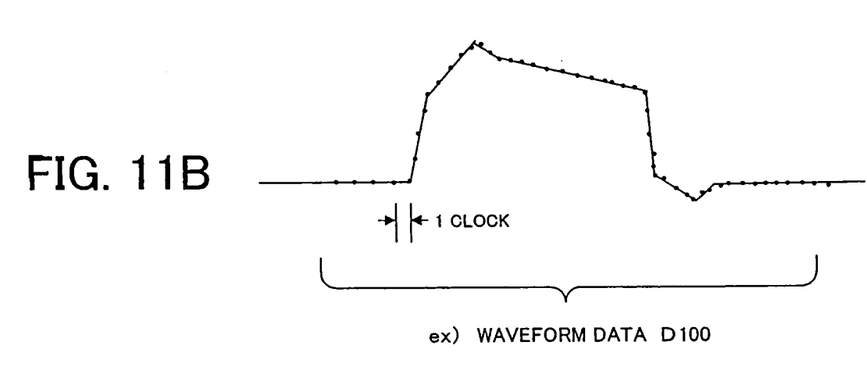

FIG. 10 shows an example of a waveform control table 122. This is the example in a case that the above-mentioned multi-pulse-type strategy is mainly utilized, and waveform data (digital data) D (D10 to D120 in the example) showing the level of each pulse forming the top pulse and the multi-pulse is stored for each pulse width and each recording power. The digital data D is formed by a group of N-bit digital level values forming the pulse having a specific pulse width, as shown in FIG. 11B. It is noted that FIG. 11B indicates the digital data D corresponding to the pulse having 1T pulse width shown in FIG. 11A, in which the levels of the rise-up and the fall-down portions are adjusted by considering effects of overshooting and undershooting. For example, the waveform data D100 whose pulse width is 1.00T and whose recording power is 10 mW is group data of the N-bit digital level values forming the pulse.

The strategy data generating unit 121 refers to the strategy table 110 based on the recording signal, and obtains the information of the strategy signal (e.g., the top pulse width, the multi-pulse width, and the power levels of the top pulse and the multi-pulse). Based on the obtained information of the strategy signal, the strategy data generating unit 121 refers to the waveform control table 122, and obtains the digital data corresponding to the top pulse and the multi-pulse to generate the strategy data, which is the digital signal.

Figure 11C:
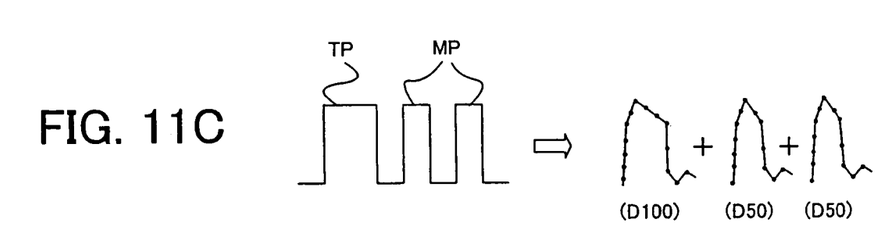

Now, like the waveform shown in FIG. 11C, assuming that a 6T recording mark is formed according to the recording signal, it is prescribed that the recording powers of both the top pulse TP and the multi-pulses MP are Pw=10 mW. If the strategy signal corresponding to 6T recording mark is formed by one top pulse TP whose pulse width is 1T and two multi-pulses MP whose pulse widths are 0.50T, the strategy data generating unit 121 refers to the waveform control table 122 shown in FIG. 10, and obtains the waveform data D100 for the one top pulse and the waveform data D50 for the two multi-pulses. Then, the strategy data generating unit 121 supplies the combination of those waveform data to an adder 141 as strategy data S20.

On the other hand, identically to the first embodiment, the high frequency data generating unit 160 refers to the high frequency signal table 170 based on the recording data, and supplies, to the adder 141, a high frequency data S21 of the frequency whose phase coincides with the strategy signal or has the constant phase relation with the strategy signal at the rise-up and the fall-down portions of the strategy signal. Therefore, the adder 141 generates recording pulse data S24 by adding strategy data S20 from the strategy data generating unit 121 and high frequency data S21 from the high frequency data generating unit 160, and supplies the data to a D/A converter 142.

The D/A converter 142 is of the current output type, and converts the digital recording pulse data S24 to the analog signal according to a predetermined clock, and drives the LD 150. In that way, the LD 150 emits the recording laser light corresponding to the recording signal.

In that way, even when the strategy signal is generated as the digital signal, the high frequency signal can be appropriately generated. In the above-mentioned example, as shown in FIG. 9, the D/A conversion is executed after the strategy data and the high frequency data are added to each other as the digital data. However, after those data are separately D/A converted to be the analog signals, the analog signals thus obtained may be added to each other.

As explained above, the information recording apparatus includes the LD emitting the recording laser light for the information recording, the recording pulse signal generating unit generating the recording pulse signal corresponding to the inputted recording signal, the high frequency signal generating unit generating the digital high frequency signal based on the recording signal, the adder generating the driving pulse signal by adding the recording pulse signal and the high frequency signal together, and the driving unit emitting the recording light by driving the LD based on the driving pulse signal. Thereby, the frequency and the superimposing quantity of the high frequency signal can be set without limitation. Therefore, it becomes possible to generate the optimum high frequency signal corresponding to the power of the recording pulse signal. Since the phase of the high frequency signal can be adjusted to the recording pulse signal, the adverse effect which the high frequency signal gives to the rise-up and fall-down edge of the recording pulse signal can be prevented. Moreover, since a preferred jitter value can be easily obtained by those controls, a system margin in high-speed recording of the information recording apparatus can be improved.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-115357 filed on Apr. 21, 2003 including the specification, claims, drawings and summary is incorporated herein by reference in its entirety.

What is claimed is:

1. An information recording apparatus comprising:
  a light source which emits a recording light for information recording;
  a recording pulse signal generating unit which generates a recording pulse signal corresponding to an inputted recording signal;
  a high frequency signal generating unit which generates a digital high frequency signal based on the recording signal;
  an adder which adds the recording pulse signal and the high frequency signal to generate a driving pulse signal; and
  a driving unit which drives the light source based on the driving pulse signal to emit the recording light, wherein the high frequency signal has a constant phase relation with the recording pulse signal at a rise-up portion and a fall-down portion of each pulse included in the recording pulse signal.

2. The information recording apparatus according to claim 1, wherein a frequency of the high frequency signal in each pulse period is determined to have the constant phase relation with the recording pulse signal at the rise-up portion and the fall-down portion of each pulse included in the recording pulse signal.

3. The information recording apparatus according to claim 1, wherein a phase of the high frequency signal coincides with a phase of the recording pulse signal at the rise-up portion and the fall-down portion of each pulse included in the recording pulse signal.

4. The information recording apparatus according to claim 1, wherein a phase of the high frequency signal is ahead of or behind a phase of the recording pulse signal by a constant angle at the rise-up portion and the fall-down portion of each pulse included in the recording pulse signal.

5. The information recording apparatus comprising:
  a light source which emits a recording light for information recording;
  a recording pulse signal generating unit which generates a recording pulse signal corresponding to an inputted recording signal;
  a high frequency signal generating unit which generates a digital high frequency signal based on the recording signal;
  an adder which adds the recording pulse signal and the high frequency signal to generate a driving pulse signal; and
  a driving unit which drives the light source based on the driving pulse signal to emit the recording light, wherein the high frequency signal generating unit determines amplitude of the high frequency signal to be optimum to a recording power level in each pulse period for each pulse period included in the recording pulse signal.

6. The information recording apparatus comprising:
  a light source which emits a recording light for information recording;
  a recording pulse signal generating unit which generates a recording pulse signal corresponding to an inputted recording signal;
  a high freqiuency signal generating unit which generates a digital high frequency signal based on the recording signal;
  an adder which adds the recording pulse signal and the high frequency signal to generate a driving pulse signal; and
  a driving unit which drives the light source based on the driving pulse signal to emit the recording light, wherein the high frequency signal has different amplitude in each pulse period included in the recording pulse signal.

7. The information recording apparatus comprising:
  a light source which emits a recording light for information recording;
  a recording pulse signal generating unit which generates a recording pulse signal corresponding to an inputted recording signal;
  a high frequency signal generating unit which generates a digital high frequency signal based on the recording signal;

an adder which adds the recording pulse signal and the high frequency signal to generate a driving pulse signal; and a driving unit which drives the light source based on the driving pulse signal to emit the recording light, wherein the high frequency signal generating unit comprises:

a high frequency signal table which stores high frequency signal data including a frequency and an amplitude predetermined corresponding to a recording mark length;

a unit which refers to the high frequency signal table, based on the recording mark length included in the inputted recording signal, to obtain the frequency and the amplitude of the high frequency signal corresponding to each recording mark; and a unit which generates the digital high frequency signal having the obtained frequency and amplitude.

8. The information recording apparatus comprising:

a light source which emits a recording light for information recording;

a recording pulse signal generating unit which generates a recording pulse signal corresponding to an inputted recording signal;

a high frequency signal generating unit which generates a digital high frequency signal based on the recording signal;

an adder which adds the recording pulse signal and the high frequency signal to generate a driving pulse signal; and a driving unit which drives the light source based on the driving pulse signal to emit the recording light, wherein the high frequency signal generating unit comprises:

a high frequency signal table which stores high frequency signal data including a frequency and an amplitude predetermined corresponding to the recording mark length and a space length preceding to the recording mark;

a unit which refers to the high frequency signal table, based on the recording mark length and the front space length included in the inputted recording signal to obtain the frequency and the amplitude of the high frequency signal corresponding to each recording mark; and a unit which generates the digital high frequency signal having the obtained frequency and amplitude.

9. The information recording apparatus according to claim 1, wherein the high frequency signal generating unit comprises a D/A converter which converts the digital high frequency signal to an analog high frequency signal, and wherein the adder adds the recording pulse signal and the analog high frequency signal to generate an analog driving pulse signal.

10. The information recording apparatus according to claim 1, wherein the recording pulse signal generating unit generates a digital recording pulse signal, and wherein the adder comprises:

a unit which generates a digital driving pulse signal by adding the digital recording pulse signal and the digital high frequency signal; and a D/A converter which converts the digital driving pulse signal to an analog driving pulse signal.

11. The information recording apparatus according to claim 1, wherein the recording pulse signal generating unit generates a digital recording pulse signal and comprises a D/A converter which converts the digital recording pulse signal to an analog recording pulse signal, wherein the high frequency signal generating unit comprises a D/A converter which converts the digital high frequency signal to an analog high frequency signal, and wherein the adder adds the analog recording pulse signal and the analog high frequency signal to generate an analog driving pulse signal.

12. An information recording method comprising:

a recording pulse signal generating process which generates a recording pulse signal corresponding to an inputted recording signal;

a high frequency signal generating process which generates a digital high frequency signal based on the recording signal;

an adding process which generates a driving pulse signal by adding the recording pulse signal and the high frequency signal; and a driving process which drives a light source based on the driving pulse signal to emit a recording light for information recording, wherein the high frequency signal has a constant phase relation with the recording pulse signal at a rise-up portion and a fall-down portion of each pulse included in the recording pulse signal.

* * * * *